United States Patent
Herrig et al.

(10) Patent No.: US 9,995,277 B2
(45) Date of Patent: Jun. 12, 2018

(54) SYSTEM AND METHOD FOR CONTROLLING THE OPERATION OF WIND TURBINES

(71) Applicant: General Electric Company, Schenectady, NY (US)

(72) Inventors: Andreas Herrig, Garching b. München (DE); Seongkyu Lee, Niskayuna, NY (US); Stefan Kern, Munich (DE); Thierry Pascal Maeder, Munich (DE); Benoit Philippe Petitjean, Munich (DE); Roger Drobietz, Rheine (DE); Sujan Kumar Pal, Bangalore (IN); Biju Nanukuttan, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 701 days.

(21) Appl. No.: 14/447,765

(22) Filed: Jul. 31, 2014

(65) Prior Publication Data
US 2016/0032892 A1    Feb. 4, 2016

(51) Int. Cl.
F03D 7/00    (2006.01)
F03D 7/02    (2006.01)
F03D 7/04    (2006.01)

(52) U.S. Cl.
CPC ........... *F03D 7/0296* (2013.01); *F03D 7/045* (2013.01); *F03D 7/048* (2013.01); *Y02E 10/723* (2013.01)

(58) Field of Classification Search
CPC ........ F03D 7/0296; F03D 7/048; F03D 7/045; Y02E 10/723
See application file for complete search history.

(56) References Cited

U.S. PATENT DOCUMENTS 6,320,272 B1    11/2001  Lading et al.
6,688,841 B1 *   2/2004  Wobben ............... F03D 7/0224
                                                    415/1

(Continued)

FOREIGN PATENT DOCUMENTS

CN    202117990 U    1/2012
CN    102721967 A    10/2012

(Continued)

OTHER PUBLICATIONS

Frehlich, R. et al., Measurements of Wind and Turbulence Profiles With Scanning Doppler Lidar for Wind Energy Applications, Selected Topics in Applied Earth Observations and Remote Sensing, IEEE Journal of, IEEE Xplore, Mar. 2008, pp. 42-47, vol. 1, Issue: 1.

(Continued)

*Primary Examiner* — Christopher E Everett
(74) *Attorney, Agent, or Firm* — GE Global Patent Operation; Nitin N. Joshi (57) ABSTRACT

A method for controlling a wind farm includes: receiving temperature data associated with a plurality of locations along a sound path between the wind farm and a sound immission point from one or more sensors; estimating a propagation characteristic of the sound path based at least in part on the temperature data; predicting a noise level at the sound immission point based at least in part on the propagation characteristic; determining a control signal for one or more wind turbines in the wind farm based at least in part on the noise level; and using the control signal to control the one or more wind turbines.

23 Claims, 6 Drawing Sheets

(56) References Cited

U.S. PATENT DOCUMENTS

| | | |
|---|---|---|
| 7,281,891 B2 | 10/2007 | Smith et al. |
| 7,887,292 B2 | 2/2011 | Kuhlmeier |
| 7,896,613 B2 | 3/2011 | Xiong |
| 7,945,350 B2 | 5/2011 | Kinzie et al. |
| 7,988,414 B2 | 8/2011 | Benito et al. |
| 8,013,460 B2 | 9/2011 | Kinzie et al. |
| 8,047,783 B2 | 11/2011 | Nies et al. |
| 8,162,610 B1 | 4/2012 | Khozikov et al. |
| 8,215,907 B2 | 7/2012 | Kooijman et al. |
| 8,221,075 B2 | 7/2012 | Nies et al. |
| 8,246,312 B2 | 8/2012 | Schubert |
| 8,321,062 B2 | 11/2012 | Nies et al. |
| 8,338,978 B2 | 12/2012 | Yasugi et al. |
| 8,347,501 B2 | 1/2013 | Petersen et al. |
| 8,426,994 B2 | 4/2013 | Nielsen et al. |
| 8,532,828 B2 | 9/2013 | Schramm et al. |
| 8,616,846 B2 | 12/2013 | Nanukuttan et al. |
| 9,347,432 B2 | 5/2016 | Herrig et al. |
| 2006/0275121 A1 | 12/2006 | Merswolke et al. |
| 2007/0031237 A1* | 2/2007 | Bonnet .......... F03D 7/048 415/1 |
| 2008/0037485 A1* | 2/2008 | Osinga .......... H04L 45/00 370/338 |
| 2009/0149999 A1* | 6/2009 | Schramm .......... F16H 57/0006 700/280 |
| 2009/0169378 A1 | 7/2009 | Menke |
| 2010/0135798 A1 | 6/2010 | Eggleston |
| 2010/0180694 A1* | 7/2010 | Ely, III .......... G01W 1/10 73/861.42 |
| 2010/0195100 A9* | 8/2010 | Caldwell .......... F03D 7/02 356/341 |
| 2011/0175356 A1* | 7/2011 | Nielsen .......... F03D 7/0296 290/44 |
| 2011/0223018 A1 | 9/2011 | Srinivasan et al. |
| 2012/0061957 A1 | 3/2012 | Steinmetz et al. |
| 2012/0134813 A1 | 5/2012 | Nies et al. |
| 2012/0169053 A1* | 7/2012 | Tchoryk, Jr. .......... G01P 5/26 290/44 |
| 2013/0140818 A1 | 6/2013 | Matesanz |
| 2013/0154263 A1 | 6/2013 | Attia |
| 2013/0156577 A1 | 6/2013 | Esbensen et al. |
| 2013/0181450 A1 | 7/2013 | Narayana et al. |
| 2013/0209220 A1* | 8/2013 | Nielsen .......... F03D 11/00 415/1 |
| 2013/0280066 A1 | 10/2013 | Scholte-Wassink et al. |

FOREIGN PATENT DOCUMENTS

| | | |
|---|---|---|
| CN | 202974425 U | 6/2013 |
| EP | 2216549 A2 | 8/2010 |
| JP | 2010216307 A | 9/2010 |
| JP | 2010216308 A | 9/2010 |
| WO | 1998042980 A1 | 10/1998 |
| WO | 2010061255 A2 | 6/2010 |
| WO | 2010086631 A2 | 8/2010 |
| WO | 2011150942 A1 | 12/2011 |
| WO | 2012146252 A2 | 11/2012 |
| WO | 2013097853 A1 | 7/2013 |
| WO | 2013139347 A1 | 9/2013 |

OTHER PUBLICATIONS

Heimann Dietrich et al., The wake of a wind turbine and its influence on sound propagation, Meteorologische Zeitschrift, ingentaconnect, Aug. 2011, pp. 449-460(12), vol. 20 , No. 4.

Andreas Herrig et al.; Titled: "System and Method for Enhanced Operation of Wind Parks"; Pending U.S. Appl. No. 14/447,848, filed Jul. 31, 2014; 59 pages.

Akshay Krishnamurty Ambekar et al.; Titled: "System and Method for Optimal Operation of Wind Farms"; Pending IN Patent Application No. 3768/CHE/2014 filed Jul. 31, 2014; 27 pages.

Piironen, "Measurements of atmospheric temperature", University of Wisconsin Lidar Group, Mar. 26 1996, retrieved from "http://lidar.ssec.wisc.edu/papers/pp_thes/node22.htm" on Jun. 29, 2016.

Emmit,"A Geosynchronous Lidar System for Atmospheric Winds and Moisture Measurements",IGARSS 2001, Sydney, Australia, Jul. 2001.

Optoatmospherics, "Atmospheric Intelligence by knowing more—sooner", 2010, retrieved from www.optoatmospherics.com on Jul. 14, 2016.

Pena, "Natural Power ZephIR Brochure Ecopy", Apr. 19, 2010, retrived from "http://www.scribd.com/doc/30195938/Natural-Power-ZephIR-Brochure-Ecopy" on Jul. 17, 2016.

Newsom et. al,"Raman Lidar Profiles—Temperature (RLPROFTEMP) Value-Added Product", ARM Climate Research Facility, US Department of Energy, Office of Science, Oct. 2012, retrived from"http://www.arm.gov/publications/tech_reports/doe-sc-arm-tr-120.pdf." on Jul, 17, 2016.

Larsson et al.,"Sound Propogation from wind turbines under various weather conditions", Uppsala University, Disciplinary Domain of Science and Technology, Earth Sciences, Department of Earth Sciences, LUVAL, 5th International Conference on Wind Turbine Noise, Denver, USA, 2013.

U.S. Appl. No. 14/813,547, filed Jul. 30, 2015.

* cited by examiner

SYSTEM AND METHOD FOR CONTROLLING THE OPERATION OF WIND TURBINES

BACKGROUND

The subject matter disclosed herein generally relates to controlling the operation of one or more wind turbines. More specifically, the subject matter relates to systems and methods for controlling the operation of one or more wind turbines based on a noise level at a sound immission point.

In recent years, the increased usage of wind turbines as an alternative source of energy and the scarcity of suitable locations for installing wind turbines have led to wind farms (i.e., one or more wind turbines) moving closer towards densely populated regions for example, residential areas. Since the operation of wind turbines generates noise emissions, regulatory authorities have imposed noise regulations that prescribe a maximum sound immission level at these residential areas. In order to comply with these noise regulations, a wind farm is sometimes operated in noise reduced operation (NRO) modes that are based on, for example, a wind speed near the hub of a wind turbine. Such NRO modes may significantly reduce the overall amount of energy produced by the wind farm. Furthermore, the noise emissions generated by the wind turbines sometimes exceed the noise regulations upon reaching the residential area due to, for example, variations in meteorological conditions in the sound path between the wind farm and the residential area.

Thus, there is a need for an enhanced system and method for controlling the operations of wind turbines.

BRIEF DESCRIPTION

In accordance with one aspect of the present invention, a method is disclosed. The method includes receiving temperature data associated with a plurality of locations along a sound path between a wind farm and a sound immission point from one or more sensors; estimating a propagation characteristic of the sound path based at least in part on the temperature data; predicting a noise level at the sound immission point based at least in part on the propagation characteristic; determining a control signal for one or more wind turbines in the wind farm based at least in part on the noise level; and using the control signal to control the one or more wind turbines.

In accordance with another aspect of the present invention, a system is disclosed. The system comprises a communication module programmed for receiving temperature data associated with a plurality of locations along a sound path between a wind farm and a sound immission point from one or more sensors; an analysis module programmed for estimating a propagation characteristic of the sound path based at least in part on the temperature data; and a controller module programmed for predicting a noise level at the sound immission point based at least in part on the propagation characteristic and generating a control signal for one or more wind turbines in the wind farm based at least in part on the noise level.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The term "coupled" is not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function. Also as used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Figure 1:
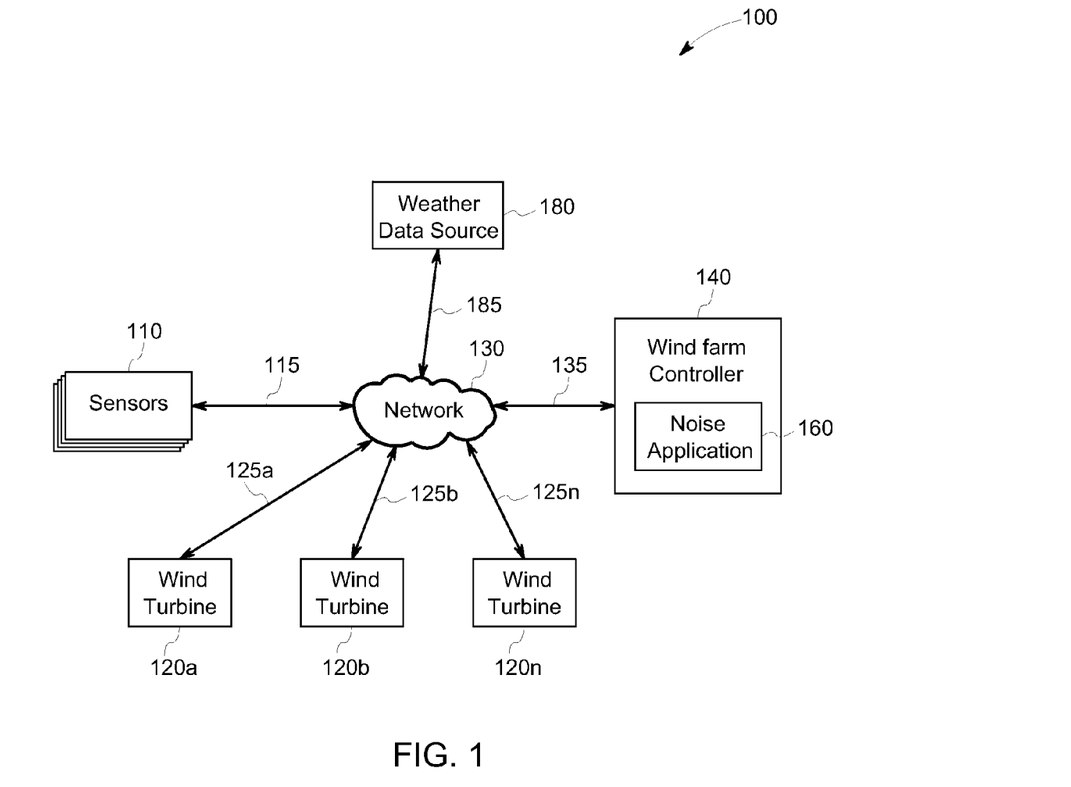
FIG. 1 is a block diagram illustrating a system for controlling the operation of one or more wind turbines according to one embodiment.

FIG. 1 illustrates a block diagram of a system 100 for controlling the operation of one or more wind turbines according to one embodiment. The illustrated system 100 comprises one or more sensors 110, an optional weather data source 180, a wind farm controller 140, and one or more wind turbines 120a, 120b, 120n. A network 130 is used to exchange information from the other elements of FIG. 1. In FIG. 1 and the remaining figures, a letter after a reference number, such as "120a," is a reference to the element having that particular reference number. A reference number in the text without a following letter, such as "120," is a general reference to any or all instances of the element bearing that reference number.

The network 130 may comprise any suitable type and configuration for communicating data. While only one network 130 is shown in FIG. 1 as being coupled to the one or more sensors 110, the weather data source 180, the wind farm controller 140 and the one or more wind turbines 120, multiple networks 130 may be used in some embodiments.

Each of the one or more sensors 110 may comprise any type of device configured to measure a physical quantity or characteristic (such as temperature, motion, pressure, light, or sound) and generate sensor data. The one or more sensors 110 are positioned to generate the data with respect to a sound path between the one or more wind turbines 120 and a sound immission point (such as a residential area, a hospital, or a light commercial area near the one or more wind turbines). The one or more sensors 110 may be installed on the one or more wind turbines 120, near the one or more wind turbines 120, at a sound immission point, or anywhere along the sound path therebetween. The one or more sensors 110 provide the sensor data to the wind farm controller 140 via the network 130. The one or more sensors 110 are communicatively coupled to the network 130 via a wired or wireless signal line 115. In one example, the one or more sensors 110 have a built-in transmission capability to send the sensor data. In another example, the one or more sensors 110 are coupled to a communication device (not shown) that facilitates the transmission of the sensor data.

In one embodiment, at least one of the sensors 110 comprises a Light Detection and Ranging (LiDAR) sensor configured to generate sensor data comprising temperature data associated with the sound path. The temperature data may comprise an average temperature, a temperature gradient (spatial gradient and/or temporal gradient), and/or a temperature profile of a region in the sound path. In a more specific embodiment, the LiDAR sensor further generates sensor data comprising wind data such as a wind speed, a wind direction, a wind standard deviation, wind skewness, wind kurtosis, a wind veer, and/or a wind shear associated with the sound path. In one embodiment, a LiDAR sensor generates the wind data and the temperature data by transmitting a light beam such as a laser beam into the atmosphere and analyzing the light beam reflected by aerosols. In an alternative or additional embodiment, at least one of the one or more sensors 110 comprises a Sound Detection and Ranging (SoDAR) sensor configured to generate sensor data by transmitting and analyzing emitted and scattered sound waves.

The one or more sensors 110 may further comprise at least one sensor for generating sensor data comprising turbine operation data such as, a rotational speed, a blade pitch, yaw, power generated by the one or more wind turbines 110, and/or visual data such as, the type of vegetation, the type of soil, the presence of water bodies, the presence of snow on the ground, and the presence of buildings along the sound path. Examples of sensors useful for collecting turbine data include sensors such as accelerometers, gyroscopes, vibration monitoring sensors, and a power generator or a converter coupled to the one or more wind turbines 110. Examples of sensors useful for collecting visual data include photographic cameras and video cameras.

The weather data source 180 may comprise any type of source with several examples including a weather satellite, a personal weather station/radar installed near the one or more wind turbines 110, and a computing device coupled to an on-line/internet weather source. The weather data may comprise, for example, atmospheric pressure, humidity, forecasted precipitation level, tornados, and the like. The weather data source 180 may provide the weather data to the wind farm controller 140 via the network 130 and be communicatively coupled to the network 130 via a wired or wireless signal line 185. Although, in the illustrated embodiment, one weather data source 180 is shown, in other embodiments, a plurality of weather data sources 180 may be coupled to the network 130.

The one or more wind turbines 120*a*, 120*b*, 120*n* may comprise any type of wind turbines that are configured to convert the kinetic energy of wind into electrical power. In one embodiment, each of the one or more wind turbines 120*a*, 120*b*, 120*n*, further comprises a turbine controller (not shown) configured to receive a control signal from the wind farm controller 140 via the network 130. The control signal instructs the turbine controller to control the operation of the one or more wind turbines 120. The one or more wind turbines 120*a*, 120*b*, 120*n*, are communicatively coupled to the network 130 via wired or wireless signal lines 125*a*, 125*b*, and 125*n* respectively.

The wind farm controller 140 may comprise any type of computing device configured to receive the sensor data and optionally the weather data and generate a control signal for controlling the operation of the one or more wind turbines 120. The wind farm controller 140 is communicatively coupled to the network 130 via a wired or wireless signal line 135. Although, in the illustrated embodiment, one wind farm controller 140 is shown, in other embodiments, multiple wind farm controllers 140 may be coupled to the network 130 or the wind farm controller 140 may be embodied in one or wind turbine controller of wind turbines 120.

Figure 2:
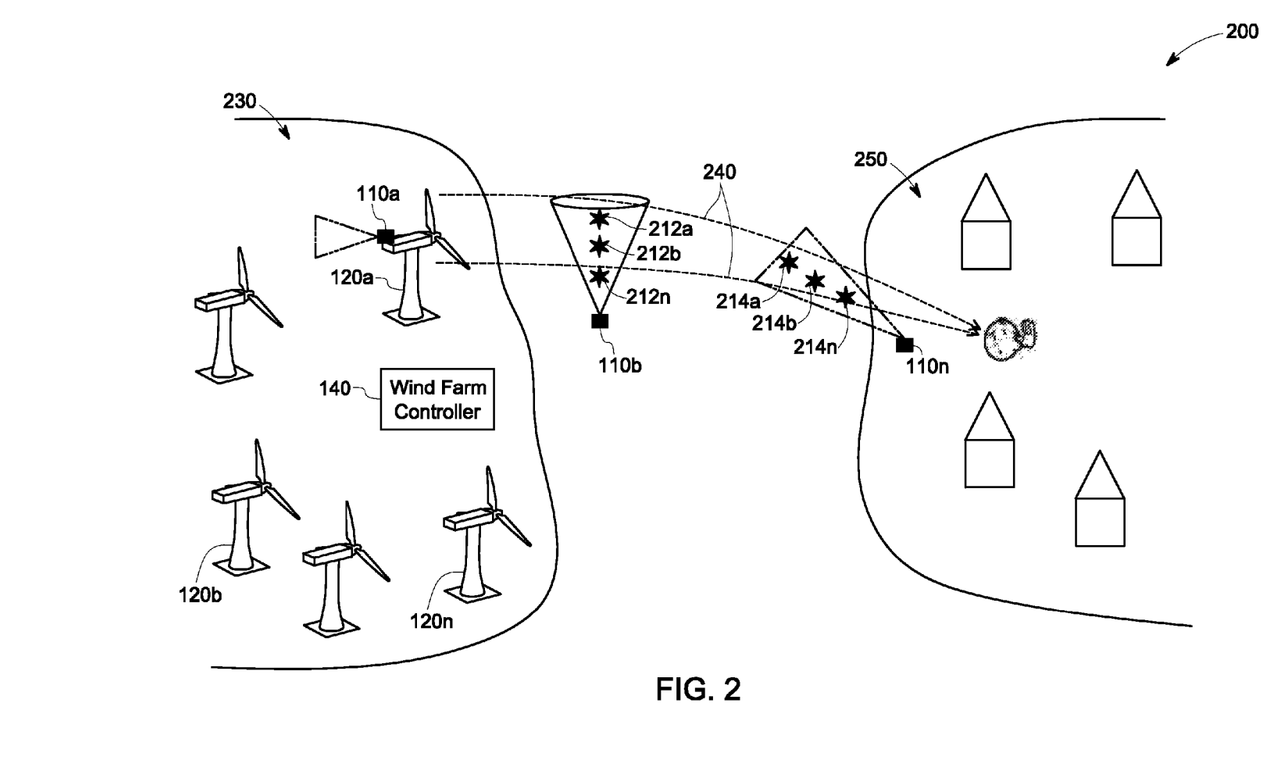
FIG. 2 is a diagrammatical representation of an implementation of a system for controlling the operation of one or more wind turbines according to one embodiment.

FIG. 2 is a diagrammatical representation 200 of an implementation of the system 100 for controlling the operation of one or more wind turbines 120 according to the embodiment of FIG. 1. The diagrammatical representation 200 illustrates a wind farm 230 and a residential area 250 (as the sound immission point). The wind farm 230 comprises the one or more wind turbines 120*a*, 120*b*, 120*n* and the wind farm controller 140. The diagrammatical representation 200 further illustrates three LiDAR sensors 110*a*, 110*b*, 110*n* that are installed along the sound path 240 between the wind farm 230 and the residential area 250. The LiDAR sensors 110*a*, 110*b*, 110*n* are installed on the wind turbine 120*a*, near the boundary of the wind farm 230, and in the residential area 250 respectively. In the embodiment of FIG. 2, the wind farm controller 140 receives temperature data and wind data associated with the sound path 240 from the LiDAR sensors 110. This is useful because even a single LiDAR sensor may obtain temperature and wind data associated with a plurality of locations along the sound path 240. For example, the temperature data received by the wind farm controller 140 from the LiDAR sensor 110*b* comprises the temperature of locations 212*a*, 212*b*, 212*n* having different altitudes/heights above the ground along the vertical axis in the sound path. As another example, the temperature data received from the LiDAR sensor 110*n* comprises the temperature of locations 214*a*, 214*b*, 214*n* having both different heights above the ground and different distances from the wind farm 230. As another example, the temperature data received from one or more sensors 110 in the sound path 240 comprises a temporal gradient of the temperature of a region in the sound path 240. In such an example, the wind farm controller 140 estimates the temperature of a plurality of locations along the sound path 240 using the temporal gradient by correlating the fluctuations and thermal convections associated with the temporal gradient.

The wind farm controller 140 then generates a control signal based on the temperature data and the wind data for controlling the operation of one or more wind turbines 120 in the wind farm 230. Although, in the illustrated embodiment, the wind farm controller 140 is shown to be installed within the wind farm 230, in other embodiments, the wind farm controller 140 may be installed outside the wind farm 230. Although, in the illustrated embodiment, one sound path 240 and one sound immission point 250 is shown, in other embodiments, the wind farm controller 140 may generate a control signal based on data received from sensors installed along any number of sound paths 240 between the wind farm 230 and any number of sound immission points 250.

Figure 3:
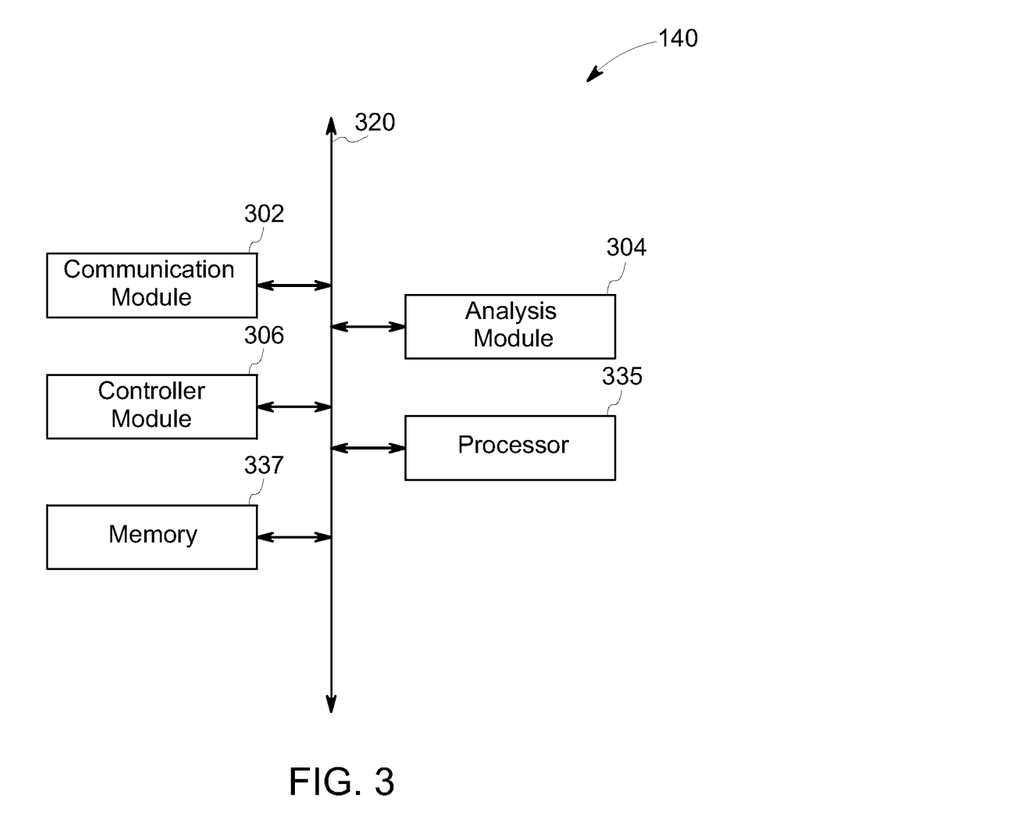
FIG. 3 is a block diagram illustrating a wind farm controller according to one embodiment.

FIG. 3 is a block diagram illustrating the wind farm controller 140 according to one embodiment. The wind farm controller 140 comprises a processor 335, a memory 337, a communication module 302, an analysis module 304, and a controller module 306 which are coupled to a bus 320 for communication with one another. The focus of the discussion herein is on the noise control functions of wind farm controller 140. It is noted that the wind farm controller will also perform other control features which are not discussed in detail herein.

The processor 335 may comprise at least one arithmetic logic unit, microprocessor, general purpose controller or other processor array to perform computations, and/or retrieve data stored on the memory 337. In one embodiment, the processor 335 may comprise a multiple core processor. In one embodiment, the processing capability of the processor 335 may be limited to supporting the retrieval of data and transmission of data. In another embodiment, the processing capability of the processor 335 may also perform more complex tasks, including various types of feature extraction, modulating, encoding, multiplexing, and the like.

The memory 337 may comprise a non-transitory storage medium. For example, the memory 337 may comprise at least one a dynamic random access memory (DRAM) device, a static random access memory (SRAM) device, flash memory or other memory device. The memory 337 may alternatively or additionally comprise a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage device.

The memory 337 stores data for use by the wind farm controller 140 to perform associated functions. In one embodiment, the memory 337 stores the communication module 302, analysis module 304, and controller module 306. The memory 337 may further store a noise threshold value that may be defined by, for example, an administrator of the wind farm controller 140 or regulatory authorities governing the permitted noise levels in a residential area.

The communication module 302 comprises code and routines programmed for handling communications between the one or more sensors, the network, the weather data source, the one or more wind turbines, and the other modules of the wind farm controller 140. In one embodiment, the communication module 302 comprises a set of instructions executable by the processor 335 to provide the functionality for handling the communication. In another embodiment, the communication module 302 is stored in the memory 337 and is accessible and executable by the processor 335. In either embodiment, the communication module 302 is adapted for communication and cooperation with the processor 335 and other modules of the wind turbine controller 140 via the bus 320. The communication module 302 receives data from the one or more sensors and optionally from the weather data source and transmits that data to the analysis module 304 either in real-time or in response to a request sent by another module of the wind turbine controller 140. In another example, the communication module 302 receives a control signal from the controller module 306 and sends the control signal to one or more wind turbines.

The analysis module 304 may comprise code and routines programmed for estimating a propagation characteristic that affects the propagation of a sound wave in the sound path. The propagation characteristic (e.g., a geometric spreading, an atmospheric absorption, a ground effect, and/or a refractive effect) may cause a sound change (e.g., an increase or decrease (damping) in the sound pressure level) to a sound wave propagating in the sound path. In one embodiment, the analysis module 304 comprises a set of instructions executable by the processor 335 to provide the functionality for estimating the propagation characteristic of the sound path. The analysis module 304 may be stored in the memory 337 and be accessible and executable by the processor 335, for example.

In one embodiment, the analysis module 304 estimates a propagation characteristic of the sound path based at least on part on the received data using, for example, an on-line noise propagation model or a self-learning model. In another embodiment, the analysis module 304 estimates the propagation characteristic of the sound path based at least in part on the received data using a look-up table stored in the memory 337. The look-up table may be defined by, for example, an administrator of the wind farm controller 140 based on simulated data or previously observed correlations between the data and propagation characteristics.

In one specific embodiment, the analysis module 304 estimates the propagation characteristic of the sound path based at least in part on the temperature data received from one or more sensors installed along the sound path. The temperature data may comprise a temperature of a region in the sound path, a temperature gradient of a region in the sound path, a temperature profile, or combinations thereof. In one example, the analysis module 304 estimates a refractive effect of the sound path based on a temperature gradient received from the sensor 110$n$ (FIG. 2). For example, when data regarding the temperature gradient indicates that the temperature is increasing with a decrease in altitude, the analysis module 304 estimates that the sound path will cause the sound waves to be refracted upwards (i.e., away from the sound immission point 250). In such an example, the refractive effect of the sound path will cause a decrease in the sound pressure level of a sound wave travelling towards the sound immission point 250. Conversely, when data regarding the temperature gradient indicates that the temperature is decreasing with a decrease in altitude, the analysis module 304 will estimate that the sound path will cause the sound waves to be refracted downwards and cause an increase in the sound pressure level of the sound wave travelling towards the sound immission point 250. In another example, that maybe in combination with or as an alternative to the height/altitude gradient example, the analysis module 304 may estimate the refractive effect of the sound path based on a temperature gradient obtained in a horizontal direction.

The analysis module 304 may further estimate the propagation characteristic of the sound path based at least in part on the wind data received from one or more sensors installed along the sound path. The wind data may comprise a wind speed, a wind direction, a wind standard deviation, wind skewness, wind kurtosis, wind veer, and/or a wind shear associated with one or more altitudes in the sound path. In one example, the analysis module 304 receives a wind direction from the sensor 110$n$ (FIG. 2) in addition to the temperature gradients described in the above example. If the wind direction indicates that the wind is blowing away from the sound immission point 250 (FIG. 2), the analysis module 304 may estimate that the wind direction will tend to decrease the sound pressure level of the sound wave travelling towards the sound immission point 250, for example. In another more specific example, the analysis module 304 correlates the received wind data and temperature data of the sound path to a likelihood of wind gusts. Predictions of wind gusts are useful because such gusts, when in the direction of the sound immission point 250, tend to cause an increase in the sound pressure level of a sound wave (i.e., a noise peak) travelling towards the sound immission point 250. Such wind gusts also tend to cause an increase in the load (i.e., a load peak) of one or more wind turbines. In such examples, LiDAR sensors are advantageous as they may be used to simultaneously measure temperature data and wind data.

The analysis module 304 may further estimate the propagation characteristic of the sound path based at least in part on the turbine operation data such as a rotational speed, a blade pitch, yaw, and/or power generated by the one or more wind turbines. The analysis module 304 estimates the propagation characteristic of the sound path by using such data directly or by using such data to infer wind data which may then be used as discussed above.

The analysis module 304 may further estimate the propagation characteristic based at least in part on the ground characteristics of the sound path. The ground characteristics may be obtained from visual data received from one or more image sensors. For example, the analysis module 304 receives an image indicating trees and buildings in the sound path. In such an example, the analysis module 304 estimates a ground effect of the sound path based at least in part on the altitude of trees and buildings in the sound path and the presence or absence of leaves in the trees.

The analysis module 304 may further estimate the propagation characteristic of the sound path based at least in part on current and/or forecasted weather data received from the weather data source. In one example, analysis module estimates the atmospheric absorption of the sound path based at least in part on the humidity level of the sound path.

The controller module 306 may comprise code and routines programmed for predicting a noise level at the sound immission point and determining a control signal for controlling the operation of one or more wind turbines. In one embodiment, the controller module 306 comprises a set of instructions executable by the processor 335. In another embodiment, the controller module 306 is stored in the memory 337 and is accessible and executable by the processor 335.

The controller module 306 receives the propagation characteristic of a sound path from the analysis module 304 and predicts the noise level at the sound immission point. The noise level at the sound immission point may be defined by, for example, an average sound pressure level of a sound wave, an amplitude modulation (i.e., a difference in the peak to peak value of sound pressure levels) of the sound wave, and/or a tonality of the sound wave. In one embodiment, the controller module 306 predicts the noise level at the sound immission point by calculating the effects (e.g., sound changes) of the propagation characteristics on the noise generated by one or more wind turbines. In one embodiment, the controller module 306 may receive information on the noise generated by the wind turbines from a noise sensor (e.g., a microphone) installed near the wind turbines. In another embodiment, the controller module 306 may infer the noise level generated by a wind turbine based on the turbine operation data (such as a power level and/or a rotational speed) received from sensors coupled to the wind turbine.

After the noise level at the sound immission point is predicted, the controller module 306 may then determine a control signal for controlling the operation of one or more wind turbines. The control signal comprises instructions for controlling the operation of the one or more wind turbines. In one example, the control signal comprises a rotational speed control signal comprising instructions for modifying the rotational speed of a wind turbine. In another example, the control signal comprises a blade pitch control signal comprising instructions for modifying a blade pitch of a wind turbine. In another example, the control signal comprises a yaw offset control signal comprising instructions for modifying the yaw offset of a wind turbine. In another example, the control signal comprises a noise mitigation device signal for instructing a turbine controller or an operator of the one or more wind turbines to perform a function such as adjusting a blade flap setting, deploying a bump on the turbine blades, or activating a flow control device on the turbine blades. In some embodiments, the control signal comprises multiple control signals for controlling two or more of these features.

In one embodiment, the controller module 306 compares the predicted noise level with a noise threshold value stored in the memory 337. If the predicted noise level is less than the noise threshold value, then the controller module does not take any noise compensation action and allows the wind turbine to operate in the most efficient manner while taking into account any other operational constraints. If the predicted noise level is greater than the noise threshold value, then the controller module generates and sends a control signal to address the excess noise.

As an example where an average sound pressure threshold value is 40 dB, if the controller module 306 calculates the average sound pressure level at the sound immission point 250 (FIG. 2) as 45 dB, then the controller module 306 generates one or more control signals for reducing the average sound pressure level at the sound immission point 250 by at least 5 dB. For example, the rotational speed and/or the blade pitch of one or more turbines may be adjusted in a manner selected to reduce the average sound pressure level by 5 dB. In another example wherein an amplitude modulation threshold value is 3 dB, if the controller module 306 calculates the amplitude module at the sound immission point as 7 dB, the control module 306 generates one or more control signals for reducing the amplitude modulation at the sound immission point by at least 4 dB. In yet another example wherein the average sound pressure threshold value is 40 dB, if the controller module 306 calculates the average sound pressure level as 39 dB and the amplitude modulation as 5 dB at the sound immission point 250, the controller module 306 generates one or more control signals for reducing the average sound pressure level at the sound immission point by at least 4 dB to account for the amplitude modulation.

The controller module 306 may send a control signal to all wind turbines or may alternatively identify one or more specific wind turbines in the wind farm to which the control signal needs to be sent. In one specific example, the controller module 306 identifies that the control signal needs to be sent to wind turbines 120a and 120n (FIG. 2) as they are located along the boundary of the wind farm 230 (FIG. 2) and thus, significantly contribute to the noise level at the sound immission point 250. In another example, if the analysis module 304 receives turbine operation data indicating that the operation of wind turbine 120b (FIG. 2) is defective, it may be inferred that the defective operation contributes to the noise level at the sound immission point 250. In such an example, the controller module 306 sends the control signal to wind turbine 120b for reducing the rotational speed or shutting down the operation of the wind turbine 120b.

The wind farm controller 140 described above is advantageous as it predicts the noise level at a sound immission point based at least in part on propagation characteristics of a sound path between the one or more wind turbines and the sound immission point. Furthermore, sending the control signal to specific wind turbines contributing to the noise level as opposed sending the control signal to all wind turbines in the wind farm is advantageous as it aids in maintaining the overall power generated by the wind farm at a level required by, for example a power grid coupled to the wind farm.

Figure 4:
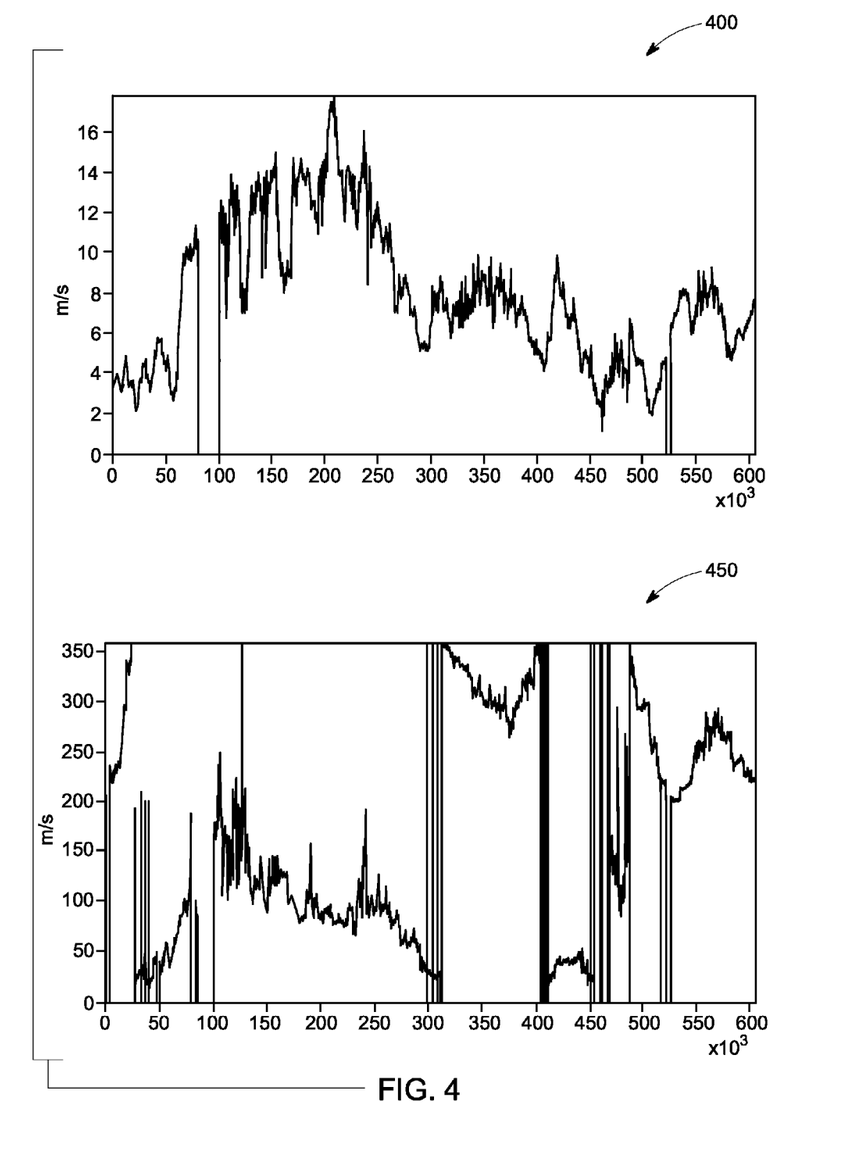
FIG. 4 is a graphical representation illustrating wind data according to one embodiment.

FIG. 4 is a graphical representation 400, 450 illustrating wind data received from a LiDAR sensor. The graph 400 illustrates the wind speed at a certain altitude in the sound path. In the illustrated graph 400, the y axis depicts the wind speed in meters/second and the x-axis represents the time in milliseconds, when the wind speed was measured by the LiDAR sensor. The graph 450 depicts the wind direction at a certain altitude in the sound path. In the illustrated graph 450, the y axis depicts the wind direction (i.e., angle) in degrees and the x-axis represents the time in milliseconds, when the wind direction was measured by the LiDAR sensor.

Figure 5:
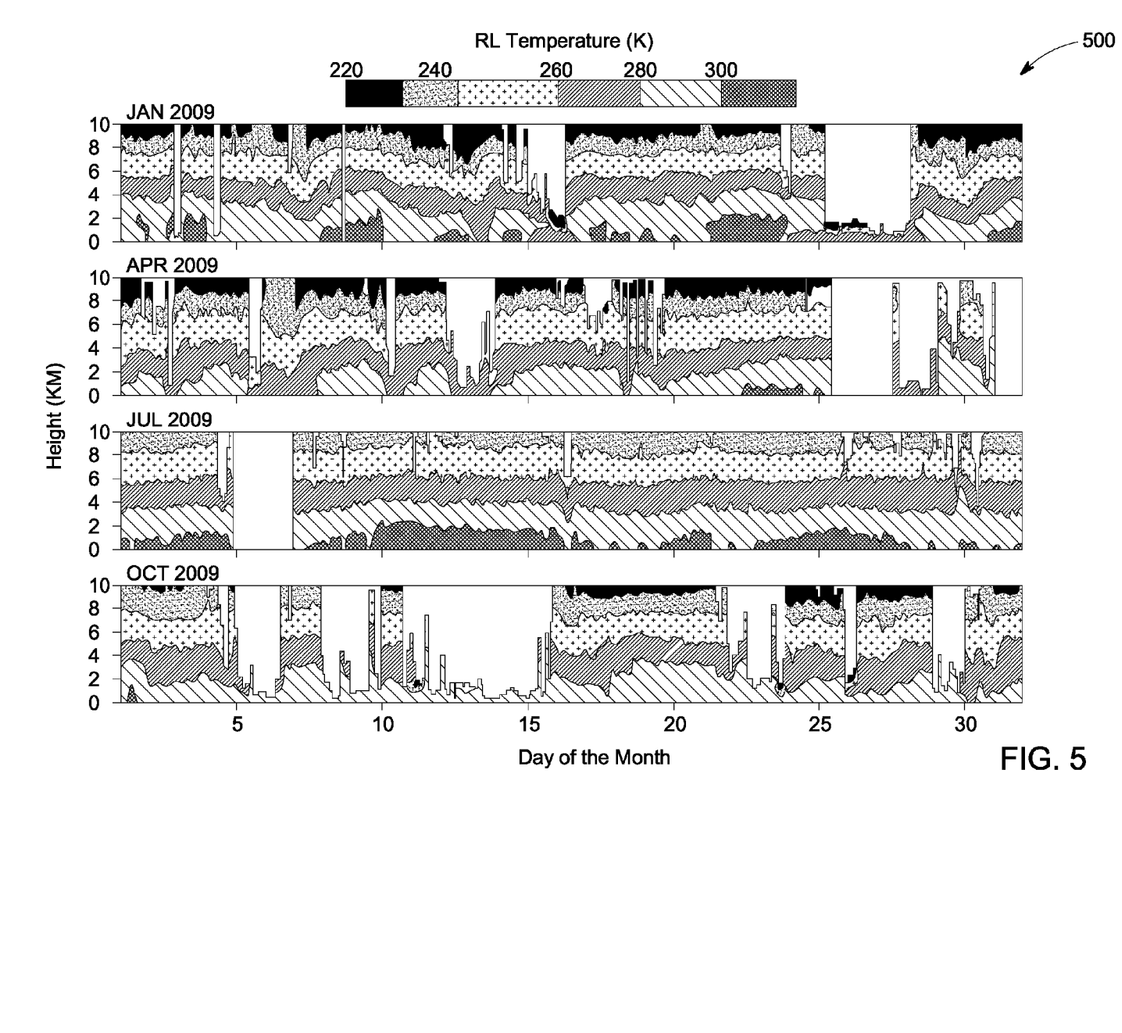
FIG. 5 is a graphical representation illustrating temperature data according to one embodiment.

FIG. 5 is an exemplary graph 500 illustrating temperature data received from a LiDAR sensor according to one embodiment. The graph 500 illustrates temperature profiles (i.e., variations of temperature based on the altitude) of a sound path measured in the months of January, April, July, and October. In the illustrated graph 500, the y axis represents the altitude at which the temperature was measured in kilometers and the x-axis represents the specific day of the month. The temperature profile received from a LiDAR sensor is advantageous since information about the altitude based temperature variations within a sound path aids the wind farm controller in accurately estimating the propagation characteristic of the sound path.

Figure 6:
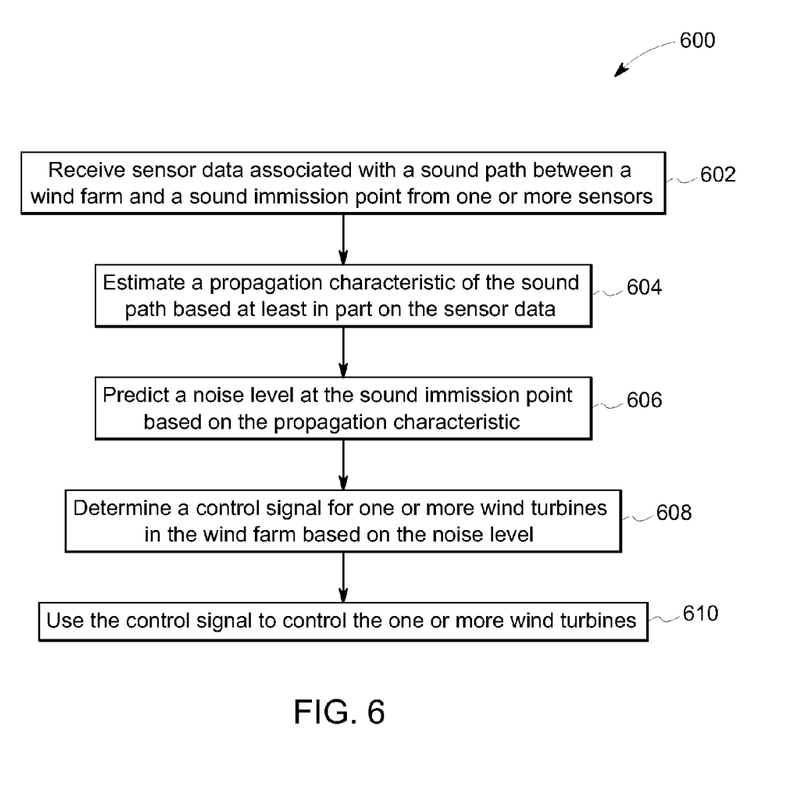
FIG. 6 is a flow diagram illustrating a method for controlling the operation of one or more wind turbines according to one embodiment.

FIG. 6 is a flow diagram illustrating a method 600 for controlling the operation of one or more wind turbines according to one embodiment. The communication module receives sensor data associated with a sound path between a wind farm and a sound immission point from one or more sensors 602. The analysis module estimates a propagation characteristic of the sound path based at least in part on the sensor data 604. For example, the analysis module estimates the propagation characteristic of the sound path based on temperature data (e.g., a temperature gradient) received from one or more sensors. In a more specific example, the analysis module estimates the propagation characteristic of the sound path based on temperature data and wind data received from one or more LiDAR sensors. In another example, the analysis module estimates the propagation characteristic of the sound path based on the temperature data in combination with wind data, turbine operation data, visual data, and/or weather data. The controller module predicts a noise level at the sound immission point based on the propagation characteristic 606. The controller module determines a control signal for one or more wind turbines in the wind farm based on the noise level 608. For example, the controller module determines a control signal for reducing the rotational speed or adjusting a blade pitch of one or more wind turbines in response to determining that the predicted noise level exceeds a noise threshold value. The controller module then uses the control signal to control the one or more wind turbines 610.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the system can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may comprise only some of the described embodiments. Accordingly, the invention is not to be seen as limited by the foregoing description, but is only limited by the scope of the appended claims.

What is claimed as new and desired to be protected by Letters Patent of the United States is:

1. A method comprising:
   receiving temperature data associated with a plurality of locations along a sound path between a boundary of a wind farm and a sound immission point from one or more sensors disposed along the sound path, wherein one or more wind turbines are located within the boundary of the wind farm and wherein the one or more sensors are installed on the one or more wind turbines, near the one or more wind turbines and at the sound immission point;
   estimating a propagation characteristic of the sound path based at least in part on temperature associated with the plurality of locations along the sound path, wherein the temperature data includes a temporal gradient at the plurality of locations and the temperature associated with the plurality of locations along the sound path is estimated using the temporal gradient at the plurality of locations by correlating fluctuations and thermal convections associated with the temporal gradient the plurality of locations;
   predicting a noise level at the sound immission point based on the propagation characteristic;
   determining a control signal for one or more wind turbines in the wind farm based at least in part on the noise level; and
   using the control signal to control the one or more wind turbines;
   wherein controlling the one or more wind turbines includes modifying a rotational speed, modifying a blade pitch, modifying a yaw offset, adjusting a blade flap setting, deploying a bump on turbine blades, activating a flow control device on turbine blades or combinations thereof.

2. The method of claim 1, further comprising receiving wind data associated with the sound path from the one or more sensors, wherein estimating the propagation characteristic of the sound path is further based at least in part on the wind data.

3. The method of claim 2, wherein the wind data further comprises at least one of a wind speed, a wind direction, a wind standard deviation, a wind skewness, a wind kurtosis, a wind veer, and a wind shear.

4. The method of claim 2 further comprising correlating the received wind data and temperature data of the sound path to predict a likelihood of wind gusts.

5. The method of claim 2, wherein the one or more sensors comprise one or more Light Detection and Ranging (LiDAR) sensors.

6. The method of claim 1, further comprising:
receiving turbine operation data from the one or more sensors, wherein estimating the propagation characteristic of the sound path is further based at least in part on the turbine operation data.

7. The method of claim 1, further comprising:
receiving weather data from a weather data source, wherein estimating the propagation characteristic of the sound path is further based at least in part on the weather data.

8. The method of claim 1, wherein estimating the propagation characteristic of the sound path is further based at least in part on a ground characteristic along the sound path.

9. The method of claim 1, wherein the control signal comprises at least one of a rotational speed control signal, a yaw offset control signal, and a blade pitch control signal.

10. The method of claim 1, further comprising:
determining whether the noise level exceeds a noise threshold value; and
using the control signal in response to determining that the noise level exceeds the noise threshold value.

11. The method of claim 1, wherein predicting a noise level at the sound immission point further comprises predicting at least one of an average sound pressure level, an amplitude modulation, and a tonality.

12. The method of claim 1, wherein the plurality of locations have different altitudes.

13. The method of claim 1, wherein the temperature data associated with a plurality of locations includes temperature of locations having different heights above the ground and different distances from the wind farm.

14. The method of claim 1, wherein the propagation characteristics includes a geometric spreading, an atmospheric absorption, a ground effect, a refractive effect or combinations thereof.

15. A system comprising:
at least one processor;
a communication module stored in a memory and executable by the at least one processor, the communication module programmed for receiving temperature data associated with a plurality of locations along a sound path between a boundary of a wind farm and a sound immission point from one or more sensors disposed along the sound path, wherein one or more wind turbines are located within the boundary of the wind farm and wherein the one or more sensors are installed on the one or more wind turbines, near the one or more wind turbines and at the sound immission point;
an analysis module stored in the memory and executable by the at least one processor, the analysis module communicatively coupled with the communication module and programmed for estimating a propagation characteristic of the sound path based at least in part on temperature associated with the plurality of locations along the sound path, wherein the temperature data includes a temporal gradient at the plurality of locations and the temperature associated with the plurality of locations along the sound path is estimated using the temporal gradient at the plurality of locations by correlating fluctuations and thermal convections associated with the temporal gradient the plurality of locations; and
a controller module stored in the memory and executable by the at least one processor, the controller module communicatively coupled with the analysis module and programmed for predicting a noise level at the sound immission point based at least in part on the propagation characteristic and generating a control signal for one or more wind turbines in the wind farm based at least in part on the noise level;
wherein the control signal is used for modifying a rotational speed, modifying a blade pitch, modifying a yaw offset, adjusting a blade flap setting, deploying a bump on turbine blades, activating a flow control device on turbine blades or combinations thereof.

16. The system of claim 15, wherein the analysis module is further programmed for estimating the propagation characteristic of the sound path based at least in part on wind data associated with the sound path.

17. The system of claim 16, wherein the wind data further comprises at least one of a wind speed, a wind direction, a wind standard deviation, a wind skewness, a wind kurtosis, a wind veer, and a wind shear.

18. The system of claim 16, wherein the one or more sensors comprise one or more Light Detection and Ranging (LiDAR) sensors.

19. The system of claim 15, wherein the analysis module is further programmed for estimating the propagation characteristic of the sound path based at least in part on weather data received from a weather data source.

20. The system of claim 15, wherein the analysis module is further programmed for estimating the propagation characteristic of the sound path based at least in part on a ground characteristic along the sound path.

21. The system of claim 15, wherein the control signal comprises at least one of a rotational speed control signal, a yaw offset control signal, and a blade pitch control signal.

22. The system of claim 15, wherein the controller module is further programmed for predicting at least one of an average sound pressure level, an amplitude modulation, and a tonality at the sound immission point.

23. The system of claim 15, wherein the plurality of locations have different altitudes.

* * * * *